United States Patent

Swafford, Jr. et al.

[11] Patent Number: 5,608,449
[45] Date of Patent: Mar. 4, 1997

[54] WIRELESS INTERACTIVE CONSUMER VIDEO SYSTEM

[75] Inventors: John W. Swafford, Jr., Lombard; William P. Carlson, Aurora, both of Ill.

[73] Assignee: RTC Industries, Inc., Rolling Meadows, Ill.

[21] Appl. No.: 332,258

[22] Filed: Oct. 31, 1994

[51] Int. Cl.$^6$ ............................................. H04N 7/173
[52] U.S. Cl. ................................... 348/13; 455/5.1
[58] Field of Search ..................... 348/12, 13, 6, 348/7; 455/6.1, 5.1, 4.2; H04N 7/173

[56] References Cited

U.S. PATENT DOCUMENTS

| | | | |
|---|---|---|---|
| 4,420,773 | 12/1983 | Toyoda et al. | 358/335 |
| 4,455,570 | 6/1984 | Saeki et al. | 348/12 |
| 4,835,604 | 5/1989 | Kondo et al. | 348/12 |
| 5,396,546 | 3/1995 | Remillard | 348/13 |

*Primary Examiner*—John K. Peng
*Assistant Examiner*—Jeffrey S. Murrell
*Attorney, Agent, or Firm*—Banner & Allegretti, Ltd.

[57] ABSTRACT

A wireless interactive consumer video system and a method for wireless communication between an input and display unit and a video electronics unit. The input and display unit includes a key pad and a video display. The input device accepts a user entry and generates a data signal corresponding to the user entry. The input and display unit transmits the data signal to the video electronics unit, which generates a video signal responsive to the data signal. The video signal is then provided to the input and display unit, which provides an image on the video display.

5 Claims, 1 Drawing Sheet

WIRELESS INTERACTIVE CONSUMER VIDEO SYSTEM

BACKGROUND OF THE INVENTION

The present invention relates generally to a wireless interactive consumer video system. In recent years, interactive technology at retail locations has become especially popular with vendors, retailers and consumers. Interactive systems are typically found at retail locations in the immediate proximity of the products promoted by the interactive unit. Interactive systems range in complexity from shelf mounted, audio only interactive units to free standing kiosks with full video and audio interactive capabilities.

Interactive units are popular with vendors for a variety of reasons. First, interactive units allow the vendor to actively market and promote its products to consumers within the retail location, where the consumer is making the actual purchase. Moreover, interactive units allow the vendor to control the information provided to consumers about its product. The use of interactive units assures the vendor that consumers will be supplied with the information that the vendor intends to provide the consumer about its products. For example, an interactive unit may be programmed to advise the consumer of the superior qualities of the vendor's products and the advantages of the vendor's products over competitors' products. Furthermore, the use of interactive systems may impress consumers and result in sales of additional products by that vendor.

Interactive units are also popular with retailers. Interactive units decrease the need for sales clerks to provide information to consumers. Similarly, retailers can minimize the training and education of sales clerks about products for which an interactive system provides consumer information. An interactive unit may also improve relations with vendors because the retailer can assure the vendor that the consumer will be provided with the exact information that the vendor wants to pass on to the consumer. Interactive units may also increase traffic flow and boost overall sales because consumers prefer to shop at stores with informative and entertaining interactive units. Retailers may also desire to associate themselves with this new type of technology in order to convince consumers that their retail operation is modem and state of the art. Moreover, if a retail location owns interactive units, it will benefit from licensing or leasing its units to vendors.

In addition, interactive units are popular with consumers. Interactive units allow consumers to enter data and quickly gather information about different products. Some consumers prefer to gather information from these units because the information received is deemed to be more accurate, current and reliable than information obtained from a sales clerk. Interactive systems may also be able to provide the consumer with considerably more information than a sales clerk. Consumers may also prefer interactive units because they provide immediate information without requiting the consumer to locate a sales clerk.

Consumers also enjoy interactive systems because they are entertaining to use and because they are deemed modem and state of the art. Because they are machines, interactive units further allow the user to spend as much or as little time as is necessary with the unit gathering basic or detailed information. In addition, some consumers may be embarrassed or uncomfortable asking a sales clerk about personal products or make sensitive inquiries of a sales clerk. These consumers may prefer to receive information about from an interactive unit than from a sales clerk.

An interactive unit may be as simple as a push button audio unit that provides audio information after a button is depressed. The typical such unit is rectangular and approximately the size of book. The exterior of the unit includes several push buttons and a template that identifies the information associated with each push button.

For example, a shampoo vendor may develop a basic audio only interactive unit that provides information and product recommendations for users with different types of hair. The template may indicate that the user should press a different buttons to learn more about different hair types. If, for example, the user presses the button marked "dry hair," the unit will provide an audio message containing information and product recommendations for dry hair. This product can be shelf mounted immediately next to the vendor's shampoo products.

Such a basic audio only unit is relatively small, light weight, inexpensive and easy to maintain and modify. These basic units are typically battery operated. Accordingly, placement of the unit in the most advantageous shelf position near the products associated with the unit is relatively easy. These basic audio only units are, however, limited to providing audio information about one of a limited number of push buttons. The internal electronics of these basic devices include a chip that contains the digitized audio messages associated with each push button. Typically, the template and the chip are removable, allowing the basic unit to be modified for use in a variety of applications by simply replacing the template and the audio message chip. Of course, any change of the information to be provided, regardless of how minor, requires that the audio message chip be replaced.

A more complex interactive unit will similarly contain multiple push buttons and may also include a screen display. The display may be an LCD display that provides textual information. Typically, an interactive unit of this type will prompt the user with a choice of inquiries from a menu driven program. After the consumer makes a choice and presses the appropriate button, the display will then provide information or prompt the user for additional entries.

For example, an automotive parts vendor may program such an interactive unit to first prompt the user to determine whether the user wants to learn information about spark plugs, shock absorbers or oil filters. The display will instruct the user the press a certain button for information about spark plugs, another button for information about shock absorbers, and another button for information about oil filters. After the user makes a selection, the display then prompts the user with additional questions, for example, the make and model of the vehicle for which the product will be used. In this manner, the user can gather facts and information about various types of products.

These text interactive units are typically twice the size of basic audio only units, and may accordingly be placed in the optimum shelf location with relative ease. These text interactive units are typically battery operated. A text interactive unit may also include audio capabilities.

By virtue of its menu driven operation, a text interactive unit can be used to provide considerably more information than a basic audio only unit. A text interactive unit is relatively more expensive than a basic audio only unit, but its capabilities are greater. A text interactive unit still requires that electronics within the unit be replaced or reprogrammed if any information must be changed. However, in today's video based society, an audio only or text only interactive system may not keep the interest of consumers.

Thus, an interactive system may also include a full video display. Typically, the display is the size of a television monitor. With a full video display, the interactive unit can be programmed to provide audio, text, video, animation and a full range of video features to interactively prompt the user for entries and data and provide the user with information. A video unit such as this may also be viewed by more than one consumer at a time.

For example, a thermostat vendor may program a video interactive system to display video and animation of its products. The system may prompt the user to respond to inquiries and enter data. The system then provides information with graphical illustrations and video presentations in response to the user entries.

A video interactive unit typically employs CD-ROM (compact disk read only memory) technology to provide the audio and video information. The standards for compressing the digital video information provided by the CD-ROM may be, for example, CDI (compact disk interactive) or MPEG (Motion Pictures Expert Group). A video interactive unit may also employ laser disk or computer disk technology to provide the video information.

In a traditional video interactive unit, the use of a full size video display necessitates a floor standing unit. These units also typically house the electronics that provide the audio and video information, for example, the CD-ROM player.

A floor standing unit has several disadvantages with consumers. First, the sheer size of such a unit, coupled with the large video display, may intimidate consumers. A consumer may be reluctant to attempt operation of the unit, fearing that the unit is difficult to operate. Second, a consumer may be reluctant to gather information about personal products based on concerns that others in the store will be able to observe the nature of the user's inquiries. Similarly, consumers may be reluctant to operate a video interactive unit for fear of making mistakes while others are watching them.

A floor standing unit will also take up considerable valuable floor space, which retailers are reluctant to relinquish. Moreover, in a typical retail store with rows of fixed shelving forming aisles, it is impractical to locate a free standing unit in the aisle. Thus, the unit can only be located along the ends of shelving, severely limiting the flexibility with which such a unit can be used. In addition, it is frequently difficult if not impossible to locate such a large unit in the immediate proximity of the products associated with the unit.

Several of these problems with the video interactive system are solved by a unit that employs a mini-video display rather than a full size display monitor. Such a mini-video display may be just a few inches diagonally and provides the same color video capabilities of a full size video display.

A mini-video display is preferable to consumers because it is more private and less intimidating. The smaller screen means that others cannot observe a users operation of the interactive system. Moreover, the smaller display can be integrated into a unit that is substantially smaller than a traditional video interactive system. A unit including the display, a keyboard and a speaker can be made approximately the same size as a text interactive unit. Thus, optimum shelf placement of the unit near the products promoted by the unit is possible. Moreover, such a unit does not take up valuable floor space.

Of course, such a mini-video interactive unit still requires the same type of electronics that a traditional full size video display unit requires. One solution to this problem is to house the electronics elsewhere on the shelf, for example, behind retail products on the shelf, and then run wires from the display unit to a video electronics unit, for example the CD-ROM player. Placement of the video electronics unit on the shelf is not preferable because shelf space is lost. Moreover, if the video electronics unit is placed on the shelf, it must be secured from consumers and made tamper proof. The video electronics unit may also be placed in a back room so that it is secure and unavailable to consumers. In such a set up, however, extensive wiring must be run to the display unit from the video electronics unit. Regardless of where the video electronics unit is placed, wiring limits the flexibility of placement of the display unit.

SUMMARY OF THE INVENTION

In a principal aspect, the present invention relates to a wireless interactive consumer video system and a method for wireless communication between an input and display unit and a video electronics unit.

The system includes an input and display unit and a video electronics unit. The input and display unit includes an input device, typically a key pad, and a video display. The input device accepts a user entry and the input and display unit generates a data send signal corresponding to the user entry. The input and display unit transmits the data send signal to the video electronics unit, which generates a video signal responsive to the data send signal. The video signal is then provided to the input and display unit, which provides an image on the video display.

Thus, an object of the present invention is a wireless interactive consumer video system. It is also an object of the present invention to remotely locate an input and display unit from a video electronics unit. Another object of the present invention is to locate the video electronics unit away from valuable retail shelf space. A further object of the present invention is to allow a video interactive unit to be more easily shelf mounted. Yet another object of the present invention is to locate the video electronics unit away from shoppers who may damage or tamper with the video electronics unit. It is also an object of the present invention to locate multiple video electronics units together at one site so that the video electronics units can be more easily maintained and repaired.

Yet a further object of the present invention is a reliable and relatively inexpensive method of controlling an interactive video system. These and other objects, features, and advantages of the present invention are discussed or are apparent in the following detailed description.

BRIEF DESCRIPTION OF THE DRAWINGS

Two embodiments of the present invention are described herein with reference to the drawings wherein.

DETAILED DESCRIPTION OF THE INVENTION

Figure 1:
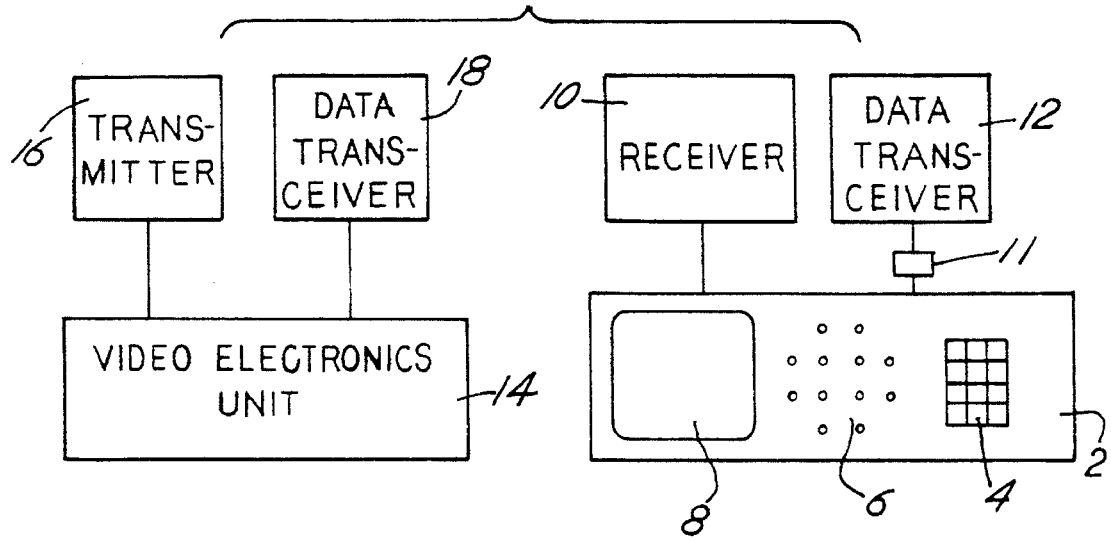
FIG. 1 is a block diagram showing an embodiment of the present invention.

Referring to FIG. 1, an embodiment of the present invention is shown as a wireless interactive consumer video system. The system includes an input and display unit 2. The input and display unit 2 includes a keypad 4, a speaker 6 and a video display 8. Coupled to the input and display unit 2 is a receiver 10 and a level convertor 11. The level convertor 11 is coupled to a first data transceiver 12.

The input and display unit 2 communicates with a video electronics unit 14. As used herein, the term video electronics unit refers to devices that generates a video signal. For example, a video electronics unit may be comprised of a laser disk player or a CD-ROM player. A video electronics unit may also include, in addition to a device that generates a video signal, additional circuitry to process input or output data or signals. Of course, a video electronics unit may also generate audio and data signals. Accordingly, as used herein, the term video signal includes a signal comprising video; video and audio; video and data; or video, audio and data components.

Referring back to FIG. 1, coupled to the video electronics unit 14 is a transmitter 16 and a second data transceiver 18. In this embodiment of the invention, operation control of the wireless interactive consumer video system is contained within the input and display unit 2.

In operation, a user approaches the input and display unit 2 and may view the video display 8, listen to audio from the speaker 6, and enter a user entry on the keypad 4. Operation instructions may be provided by the video display 8, the speaker 6, or by instructions preprinted on the exterior of the input and display unit 2.

The user initiates operation by pressing a button on the keypad 4 and providing a user entry. After the user depresses a button on the keypad 4 and generates a user entry, the input and display unit 2 generates a data send signal corresponding to the user entry that is sent to the level convertor 11. The level convertor 11 boosts the data send signal output level from the input and display unit 2. Without boosting, the data send signal output of the input and display unit 2 is insufficient to drive the first data transceiver 12. Accordingly, the data send signal, boosted by the level convertor 11, is provided to the data transceiver 12. The first data transceiver 12 then transmits the data send signal to the second data transceiver 18. Transmission of the data send signal between the first data transceiver 12 and the second data transceiver 18 is wireless.

After receiving the data send signal, the second data transceiver 18 provides the data send signal to the video electronics unit 14. After the video electronics unit 14 receives the data send signal, the video electronics unit 14 generates a video signal corresponding to the data send signal. Again, the video signal may include an audio or data component. The video signal is provided to the transmitter 16. The video electronics unit 16 then transmits the video signal to the receiver 10. Transmission of the video signal between the transmitter 16 and the receiver 10 is wireless.

After the receiver 10 receives the video signal, the receiver 10 provides the video signal to the input and display unit 2. After the input and display unit 2 receives the video signal, the input and display unit 2 provides appropriate signals to the video display 8 and the speaker 6. Accordingly, the video display 8 may display a video image and the speaker 6 may broadcast an audio signal.

Thus, the user observes the video display 8 or listens to the speaker 6 and is provided with information or a follow-up inquiry. The user may then respond to the video display or speaker and press an appropriate button on the keypad 4. Depressing a button on the keypad 4 will generate a user entry and cause the input and display unit 2 to again provide a data send signal to the first data transceiver 12. The above process then repeats itself, allowing the user to interactively interface with the wireless interactive consumer video system.

Data may also be transmitted from the video electronics unit 14 to the input and display unit 2 to provide information about the operation of the video electronics unit 14 to the input and display unit 2. For example, the input and display unit 2 may query the video electronics unit 14 to ascertain whether the video electronics unit 14 is operating properly, or the input and display unit 2 may query the video electronics unit 14 to acknowledge receipt of data by the video electronics unit 14.

In this embodiment of the invention, the data send signal is provided from the second data transmitter 18 to the video electronics unit 14 without further processing or logic control. In other embodiments of the invention, it may be necessary to process the data send signal before that signal is provided to the video electronics unit 14.

Figure 3:
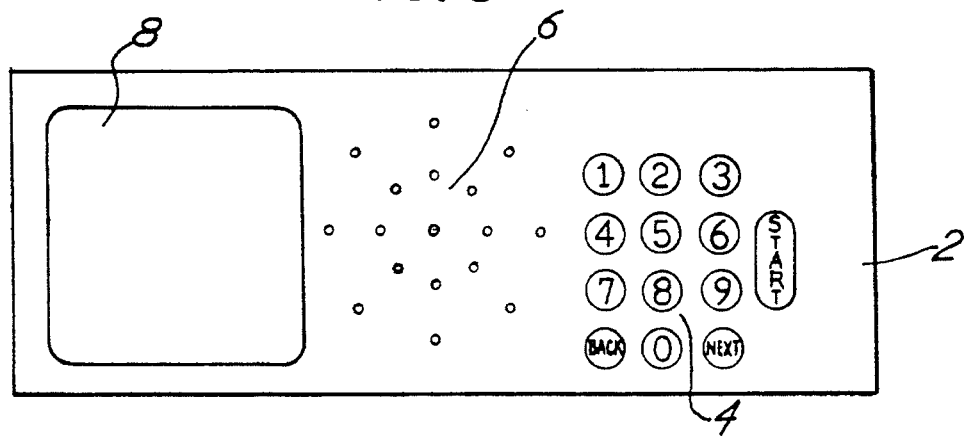
FIG. 3 is a depiction of the front of an input and display unit shown in FIG. 1.

In this embodiment of the invention, the video electronics unit 14 is a Pioneer LDV 2200 laser video disk player. The data transceivers 12, 18 are manufactured by Proxim, Inc. model number PL-2, which communicate in the range 902–928 MHz, and use spread spectrum technology to avoid interference. The transmitter 16 and the receiver 10 are manufactured by Pelto, model number WLV 1000RX-1. These units employ microwave technology and transmit at 2414.5 MHz. Units may be purchased in matched pairs to transmit and receive at different frequencies. The input and display unit 2 is a standard Minivideo unit manufactured by RTC Industries. The Minivideo unit employs an Intel 80C31 8 bit microprocessor. FIG. 3 depicts the front of such an input and display unit 2. Shown in FIG. 3 is the keypad 4, the speaker 6 and the video display 8. The level convertor 11 is an integrated circuit manufactured by Maxim, Max model 233. The chip boosts the output from the Minivideo unit from the range 0–5 volts to the range −10 to +10 volts, a level sufficient to drive the Proxim data transceiver 12.

Figure 2:
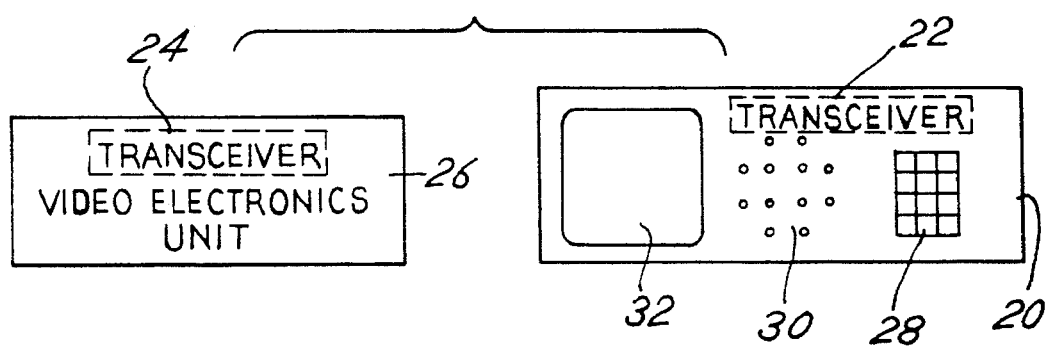
FIG. 2 is a block diagram showing a second embodiment of the present invention.

Referring to FIG. 2, in another embodiment of the invention, a data transceiver and a receiver are combined into a first transceiver 22 that transmits and receives data and transmits a video signal. Again, the video signal may include an audio or data component. The first transceiver 22 is integrated within an input and display unit 20. Similarly, a data transceiver and a transmitter are combined into a second transceiver 24 that transmits and receives data and transmits the video signal. The second transceiver 24 is integrated into the video electronics unit 26. In this embodiment of the invention, the video electronics unit 26 includes a CD ROM (compact disk ready only memory) unit.

The input and display unit 20 includes a keypad 28, a speaker 30, a video display 32, and the first transceiver 22. In operation, a user approaches the input and display unit 20 and may view the video display 32 and listen to audio from the speaker 30. Operation instructions may be provided by the video display 32, the speaker 30, or by instructions preprinted on the exterior of the input and display unit 20.

A user initiates operation by pressing a button on the keypad 28 and providing a user entry. After the user depresses a button on the keypad 28 and generates a user entry, the input and display unit 20 generates a data send signal corresponding to the user entry. The data send signal is sent from the input and display unit 20 to the video electronics unit 26 via the first transceiver 22 and the second transceiver 24. Transmission of the data send signal between the first transceiver 22 and the second transceiver 24 is wireless.

After receiving the data send signal, the video electronics unit 14 generates a video signal corresponding to the data send signal. The video signal is sent from the video electronics unit 26 to the input and display unit 20 via the second transceiver 24 and the first transceiver 22. Transmission of the video signal between the second transceiver 24 and the first transceiver 22 is wireless.

After the input and display unit 20 receives the video signal, the input and display unit 20 provides appropriate signals to the video display 32 and the speaker 30. Accordingly, the video display 32 may display a video image and the speaker 30 may broadcast an audio signal.

Thus, the user observes the video display 32 or listens to the speaker 30 and is provided with information or a follow-up inquiry. The user may then respond to the video display or speaker and press an appropriate button on the keypad 28. Depressing a button on the keypad 28 will generate a user entry and cause the input and display unit 20 to again provide a data send signal to video electronics unit 26. The above process then repeats itself, allowing the user to interactively interface with the wireless interactive consumer video system.

Data may also be transmitted from the video electronics unit 26 to the input and display unit 20 to provide information about the operation of the video electronics unit 16 to the input and display unit 20. For example, the input and display unit 20 may query the video electronics unit 26 to ascertain whether the video electronics unit 26 is operating properly, or the input and display unit 20 may query the video electronics unit 26 to acknowledge receipt of data by the video electronics unit 26.

Two embodiments of the present invention have been described herein. It is to be understood, however, that changes and modifications may be made in these embodiments without departing the true scope and spirit of the present invention as defined by the following claims. By way of example only, the keypad 4 may be replaced by any of a variety of forms of an input panel, such as a voice recognition device or a touch sensitive video input screen. In addition, the circuitry controlling the system need not be contained within the input and display unit. Instead, control of the system may be contained within the video electronics unit 14 and the input and display unit may operate as a dummy terminal, or control circuitry may be contained in both the input and display unit 2 and video electronics unit 14. Moreover, the system has applications beyond use with consumers, and the system has applications beyond use in retail stores.

We claim:

1. A method for wireless communication between an input and display unit located in a retail store location and a video electronics unit physically separated and distantly located from said input and display unit, comprising the steps of:

receiving a user entry at said input and display unit;

generating a data send signal corresponding to said user entry;

wirelessly transmitting said data send signal to said video electronics unit via a transceiver;

generating a video signal responsive to said data send signal;

wirelessly providing said video signal to said input and display unit via a transmitter;

generating operating data of said video electronics unit; and wirelessly transmitting said operating data to said input and display unit.

2. A method as in claim 1 further including the steps of:

generating receipt acknowledgment data from said video electronics unit; and wirelessly transmitting said receipt acknowledgment data to said input and display unit.

3. A method of wireless communication, at a retail store location, between an input and display unit for use by consumers and a video electronics unit physically separated from said input and display unit, comprising the steps of:

receiving a user entry at a keyboard on said input and display unit;

generating a data send signal corresponding to said user entry;

providing said data send signal to a first data transceiver;

transmitting said data send signal from said first data transceiver to a second data transceiver;

providing said data send signal received by said second transceiver to said video electronics unit;

generating a video signal responsive to said data send signal;

providing said video signal to a transmitter;

transmitting said video signal from said transmitter to a receiver coupled to said input and display unit;

providing said video signal to a video display and to a speaker coupled to said input and display unit;

transmitting data from said video electronics unit to said input and display unit to acknowledge receipt of said data send signal from said input and display unit; and repeating the above steps to allow interactive audio and video, responsive to said user entry.

4. A method as in claim 3 further including the steps of:

generating operating data of said video electronics unit; and wirelessly transmitting said operating data to said input and display unit.

5. A wireless interactive consumer video system comprising, in combination:

an input and display unit, comprising a video display and an input panel for accepting a user entry, said input and display unit providing a data send signal corresponding to said user entry:

a first data transceiver, coupled to said input and display unit, for wireless transmission of mid data send signal to a second data transceiver coupled to a video electronics unit located in a retail store location, said video electronics unit generating a video signal corresponding to said data send signal and predetermined and prestored video data, said first data transceiver comprising a second transmitter and a first receiver;

a first transmitter, coupled to said video electronics unit, for wireless transmission of said video signal to said first receiver coupled to said input and display unit, said second data transceiver comprising said first transmitter and a second receiver;

wherein said input and display unit displays a video image on said video display corresponding to said video signal and said video electronics unit generates an operation data signal that is wirelessly transmitted from said video electronics unit to said input and display unit to provide information on the operation of said video electronics unit.

\* \* \* \* \*

UNITED STATES PATENT AND TRADEMARK OFFICE
CERTIFICATE OF CORRECTION

PATENT NO. : 5,608,449
DATED : March 4, 1997
INVENTOR(S) : Swafford et al.

It is certified that error appears in the above-indentified patent and that said Letters Patent is hereby corrected as shown below:

Col. 1, line 43, reads "that their retail operation is modem" and should read --that their retail operation is modern--

Col. 1, ln. 55 reads "information without requiting the" and should read --information without requiring the--

Col. 1, ln. 58 reads "they are deemed modem" and should read --they are deemed modern--

Col. 6, ln. 25 reads "manufactured by Pelto" and should read --manufactured by Pelco--

UNITED STATES PATENT AND TRADEMARK OFFICE
CERTIFICATE OF CORRECTION

PATENT NO. : 5,608,449
DATED : March 4, 1997
INVENTOR(S) : Swafford et al.

It is certified that error appears in the above-indentified patent and that said Letters Patent is hereby corrected as shown below:

Col. 8, Cl. 5 reads "to said user entry:" and should read --to said user entry;--

Signed and Sealed this

Second Day of December, 1997

*Attest:*

BRUCE LEHMAN

*Attesting Officer*  *Commissioner of Patents and Trademarks*